United States Patent
Sutherland et al.

(10) Patent No.: US 12,475,286 B1
(45) Date of Patent: Nov. 18, 2025

(54) SYSTEM AND METHOD FOR COMPARING CIRCUIT DESIGN CONSTRAINT SETS

(71) Applicant: Cadence Design Systems, Inc., San Jose, CA (US)

(72) Inventors: Jeannette Newman Sutherland, Cedar Park, TX (US); Amit Dhuria, Fremont, CA (US); Arvind Nembili Veeravalli, Bangalore (IN); Sarath Jayalath Kirihennedige, Fair Oaks, CA (US); Saulius Kersulis, Pleasanton, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 726 days.

(21) Appl. No.: 17/841,056

(22) Filed: Jun. 15, 2022

(51) Int. Cl.
*G06F 30/3312* (2020.01)
*G06F 111/04* (2020.01)
*G06F 119/12* (2020.01)

(52) U.S. Cl.
CPC ...... *G06F 30/3312* (2020.01); *G06F 2111/04* (2020.01); *G06F 2119/12* (2020.01)

(58) Field of Classification Search
CPC .......... G06F 30/3312; G06F 2111/04; G06F 2119/12
USPC ........................................................ 716/100
See application file for complete search history.

(56) References Cited

U.S. PATENT DOCUMENTS

| 8,977,995 B1 * | 3/2015 | Arora ............... G06F 30/327 716/108 |
| 10,467,365 B1 * | 11/2019 | Kulshreshtha ........ G06F 30/396 |
| 2007/0156367 A1 * | 7/2007 | Kucukcakar ....... G01R 31/2894 702/123 |

FOREIGN PATENT DOCUMENTS

| CN | 101192251 A * | 6/2008 | ......... G06F 17/5031 |

OTHER PUBLICATIONS

Jeong et al., Toward Effective Utilization of Timing Exceptions in Design Optimization, 2010, IEEE (Year: 2010).*

* cited by examiner

*Primary Examiner* — Suresh Memula
(74) *Attorney, Agent, or Firm* — Mark H. Whittenberger; Holland & Knight LLP

(57) ABSTRACT

Embodiments included herein are directed towards a method for comparing constraint sets. The embodiments may include determining, using at least one processor, at least one arrival propagation time corresponding to at least one endpoint, the at least one endpoint associated with a first constraint set and a second constraint set. The embodiments may further include creating, using the at least one processor, a first tag associated with the first constraint set and a second tag associated with the second constraint set. The embodiments may also include determining, using the at least one processor, at least one of: a non-equivalent path exception corresponding to the at least one endpoint and based at least in part on at least one of the arrival propagation time, the first tag, and the second tag; and an equivalent path exception corresponding to the at least one endpoint.

20 Claims, 9 Drawing Sheets

SYSTEM AND METHOD FOR COMPARING CIRCUIT DESIGN CONSTRAINT SETS

FIELD OF THE INVENTION

The present disclosure relates to electronic circuit design, and more particularly, to a method for comparing sets of constraints for a circuit design netlist.

BACKGROUND

Circuit design has led to increasingly complex timing constraints. Timing constraint specifications may be expressed in formats such as Synopsys Design Constraints (SDC). The timing constraints may include, for example, minimal/maximal delays and multi-cycle paths. Some paths may be designated as "timing false paths" (or "false paths') that should not be constrained in the optimization of the design (e.g., because the path relates to a system redundancy). As the original design is further refined, the original timing constraint specification may no longer be valid. Further, comparing different versions of constrained designs may consume computing resources in an undesirable manner.

SUMMARY

In one or more embodiments of the present disclosure, a computer-implemented method for comparing constraint sets of a circuit design is provided. The method included herein may include determining, using at least one processor, at least one arrival propagation time corresponding to at least one endpoint, the at least one endpoint associated with a first constraint set and a second constraint set of the circuit design. The method may further include creating, using the at least one processor, a first tag associated with the first constraint set and a second tag associated with the second constraint set. The method may also include determining, using the at least one processor, at least one of: a non-equivalent path exception corresponding to the at least one endpoint and based at least in part on at least one of the arrival propagation time, the first tag, and the second tag; and an equivalent path exception corresponding to the at least one endpoint and based at least in part on the arrival propagation time, the first tag, and the second tag. The method may additionally include indicating, using the at least one processor, at least one of the non-equivalent path exception and the equivalent path exception.

One or more of the following features may be included. The method may include creating at least one timing graph based at least in part on at least one of the first constraint set and the second constraint set. The method may also include mapping a first clock associated with the first constraint set to a second clock associated with the second constraint set. The method may further include propagating the first tag associated with the first constraint set and the second tag associated with the second constraint set through the at least one timing graph. At least one of the first tag and the second tag may be embedded in timing data propagated through the at least one timing graph. The comparing of the constraint sets of the circuit design may be performed at the at least one timing endpoint during propagation of the at least one timing graph and may be based on, at least in part, the first tag and the second tag. The first tag may correspond to a first phase of a first view associated with the first constraint set. The second tag may correspond to a second phase of a second view associated with the second constraint set. The first view may include the second tag. The second view may include the first tag.

In one or more embodiments of the present disclosure, a computer-readable storage medium having stored thereon instructions that when executed by a machine result in the following operations is provided. The operations may include determining, using at least one processor, at least one arrival propagation time corresponding to at least one endpoint, the at least one endpoint associated with a first constraint set and a second constraint set of the circuit design. The operations may further include creating, using the at least one processor, a first tag associated with the first constraint set and a second tag associated with the second constraint set. The operations may also include determining, using the at least one processor, at least one of: a non-equivalent path exception corresponding to the at least one endpoint and based at least in part on at least one of the arrival propagation time, the first tag, and the second tag; and an equivalent path exception corresponding to the at least one endpoint and based at least in part on the arrival propagation time, the first tag, and the second tag. The operations may additionally include indicating, using the at least one processor, at least one of the non-equivalent path exception and the equivalent path exception.

One or more of the following features may be included. The operations may include creating at least one timing graph based at least in part on at least one of the first constraint set and the second constraint set. The operations may also include mapping a first clock associated with the first constraint set to a second clock associated with the second constraint set. The operations may further include propagating the first tag associated with the first constraint set and the second tag associated with the second constraint set through the at least one timing graph. At least one of the first tag and the second tag may be embedded in timing data propagated through the at least one timing graph. The comparing of the constraint sets of the circuit design may be performed at the at least one timing endpoint during propagation of the at least one timing graph and may be based on, at least in part, the first tag and the second tag. The first tag may correspond to a first phase of a first view associated with the first constraint set. The second tag may correspond to a second phase of a second view associated with the second constraint set. The first view may include the second tag. The second view may include the first tag.

In one or more embodiments of the present disclosure, a system is provided. The system may include a computing device having at least one processor and a memory for comparing circuit design constraint sets. The at least one processor may be configured to determine at least one arrival propagation time corresponding to at least one endpoint, the at least one endpoint associated with a first constraint set and a second constraint set of a circuit design. The at least one processor may be further configured to create a first tag associated with the first constraint set and a second tag associated with the second constraint set. The at least one processor may also be configured to determine at least one of: a non-equivalent path exception corresponding to the at least one endpoint and based at least in part on at least one of the arrival propagation time, the first tag, and the second tag; and an equivalent path exception corresponding to the at least one endpoint and based at least in part on the arrival propagation time, the first tag, and the second tag. The at least one processor may additionally be configured to indicate at least one of the non-equivalent path exception and the equivalent path exception.

One or more of the following features may be included. The at least one processor may be configured to create at least one timing graph based at least in part on at least one of the first constraint set and the second constraint set. The at least one processor may be further configured to map a first clock associated with the first constraint set to a second clock associated with the second constraint set. The at least one processor may also be configured to propagate the first tag associated with the first constraint set and the second tag associated with the second constraint set through the at least one timing graph. At least one of the first tag and the second tag may be embedded in timing data propagated through the at least one timing graph. The comparing of the constraint sets of the circuit design may be performed at the at least one timing endpoint during propagation of the at least one timing graph and may be based on, at least in part, the first tag and the second tag. The first tag may correspond to a first phase of a first view associated with the first constraint set. The second tag may correspond to a second phase of a second view associated with the second constraint set. The first view may include the second tag. The second view may include the first tag.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
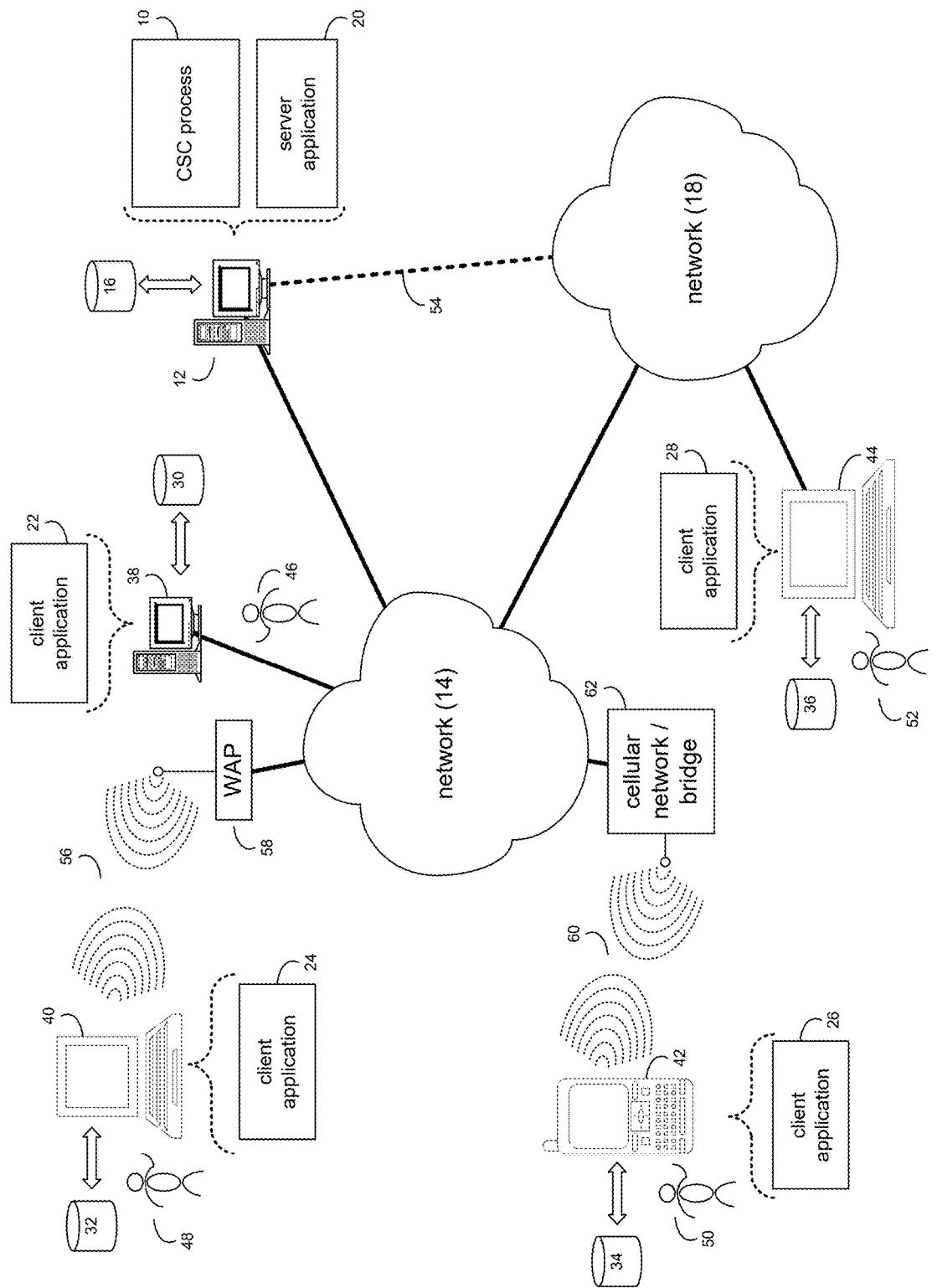
FIG. 1 diagrammatically depicts a constraint set comparison (CSC) process coupled to a distributed computing network.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. Like reference numerals in the drawings denote like elements.

Comparing different versions of constrained circuit designs may be performed line by line or constraint by constraint. Comparing the constrained circuit designs by functional equivalence may be preferable for the end user. Reference to a design-based standard that enables timing constraints to be compared for inconsistent and redundant constraints may facilitate comparing constrained circuit designs, but a need for improved verification and comparison of circuit design constraints may remain. For example, comparing circuit design constraint sets on a netlist for functional equivalence may be very time consuming, particularly for path-related constraints. Existing solutions may rely on path tracing, which may lead to an exponential number of operations at runtime, as explained below.

In some situations, comparing two sets of circuit design constraints over the same circuit design netlist may involve a complete circuit design loaded into a system (e.g., checking two sets of constraints for the same circuit design) or may involve a hierarchical subset of the circuit design (e.g., checking top constraints versus block constraints for a hierarchical instance within the circuit design). A circuit design netlist ("netlist") may include a list of electronic components of a circuit and of nodes to which the electronic components may be connected.

For example, a circuit design constraint comparison (or checking) algorithm (or process) may include loading each constraint set into its own analysis view. The algorithm may further include comparing clocks between the two analysis views to find related clock pairs. The algorithm may also include checking constraint equivalence based on assertions in each view while considering the related clock pairs where appropriate.

Checking for constraint consistency may be complex because comparing path exception equivalence (or any other path-based constraint) may introduce challenges. Typically, comparison of path-related constraints may include tracing netlist logic related to the constraints to find paths which satisfy a constraint in one set but have no equivalent constraint in another set. This can be an exponential process, depending on the design netlist. Further, checking for path exception equivalence may not be based on specific exception pins but rather on their impact on the timing endpoints of the circuit design. This may allow for differences in path specification which are functionally equivalent and avoid reporting of differences for constraints which may not be relevant to timing analysis (e.g., lower priority constraints which are overridden or constraints which do not apply to any path in the design). Existing solutions may be based on path tracing from the timing endpoints to which the path constraints apply. Such path enumeration may be exponential in nature and may be costly.

Timing graph arrival time propagation algorithms may propagate a set of phases through a netlist. A timing graph may represent timing-specific relationships among pins in the netlist and may include view-dependent data (e.g., stored with the timing graph). The timing graph itself may be a structural representation of the netlist and the phases may be propagated through the graph in a view-specific manner. A phase may be a representation of an arrival time along with launching clock information, path constraint information, and further information related to one or more paths associated with computation of the arrival time, for each view being analyzed. A view may be a combination of timing constraints and conditions impacting timing analysis. For constraint comparison, an independent view may be created for each constraint set. The phases may be view-specific and phase propagation may be performed independently for each view.

Using the techniques and features described by the present disclosure, a phase mechanism may be extended such that a phase for each view may include information about the phase of a corresponding view, which may enable a phase-based check at each timing endpoint to determine if a constraint referred to by the phase of one view has an equivalent constraint referred to by the phase of the corresponding other view (and vice versa), and enable a direct equivalence comparison, without extra runtime expense. For example, the phase mechanism may include tags that indicate a correspondence between a phase in one view and an equivalent phase in another view. An indication of equivalent phases may refer to a launching clock in each phase being equivalent with constraint-related information being equivalent.

Thus, the techniques and features described by the present disclosure may improve constraint set comparison by building constraint equivalence linearly during timing graph propagation to avoid the performance issues of existing approaches. By embedding information into timing data normally propagated through the timing graph, comparison may be performed at timing endpoints in linear time. The timing data may include or be related to arrival times, launching clocks, launching clock edges, path exception tags, and various other tags.

Referring to FIG. 1, there is shown a constraint set comparison ("CSC") process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™, Novell Netware™, or Redhat Linux™, for example. Additionally and/or alternatively, CSC process 10 may reside on a client electronic device, such as a personal computer, notebook computer, personal digital assistant, or the like.

The instruction sets and subroutines of CSC process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS tm, Novell Webserver tm, or Apache Webserver tm, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute CSC process 10. Examples of client applications 22, 24, 26, 28 may include, but are not limited to, design verification tools such as those available from the assignee of the present disclosure. These applications may also be executed by server computer 12. In some embodiments, CSC process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the CSC process may be a client-side application residing on one or more client electronic devices 38, 40, 42, 44 (e.g., stored on storage devices 30, 32, 34, 36, respectively). As such, the CSC process may be a stand-alone application that interfaces with a client application (e.g., client applications 22, 24, 26, 28), or may be an applet/application that is executed within a client application. As such, the CSC process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize formal analysis, testbench simulation, and/or hybrid technology features to verify a particular integrated circuit design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, CSC process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows tm, Microsoft Windows CE tm Redhat Linux tm, Apple IOS, ANDROID, or a custom operating system.

Figure 2:
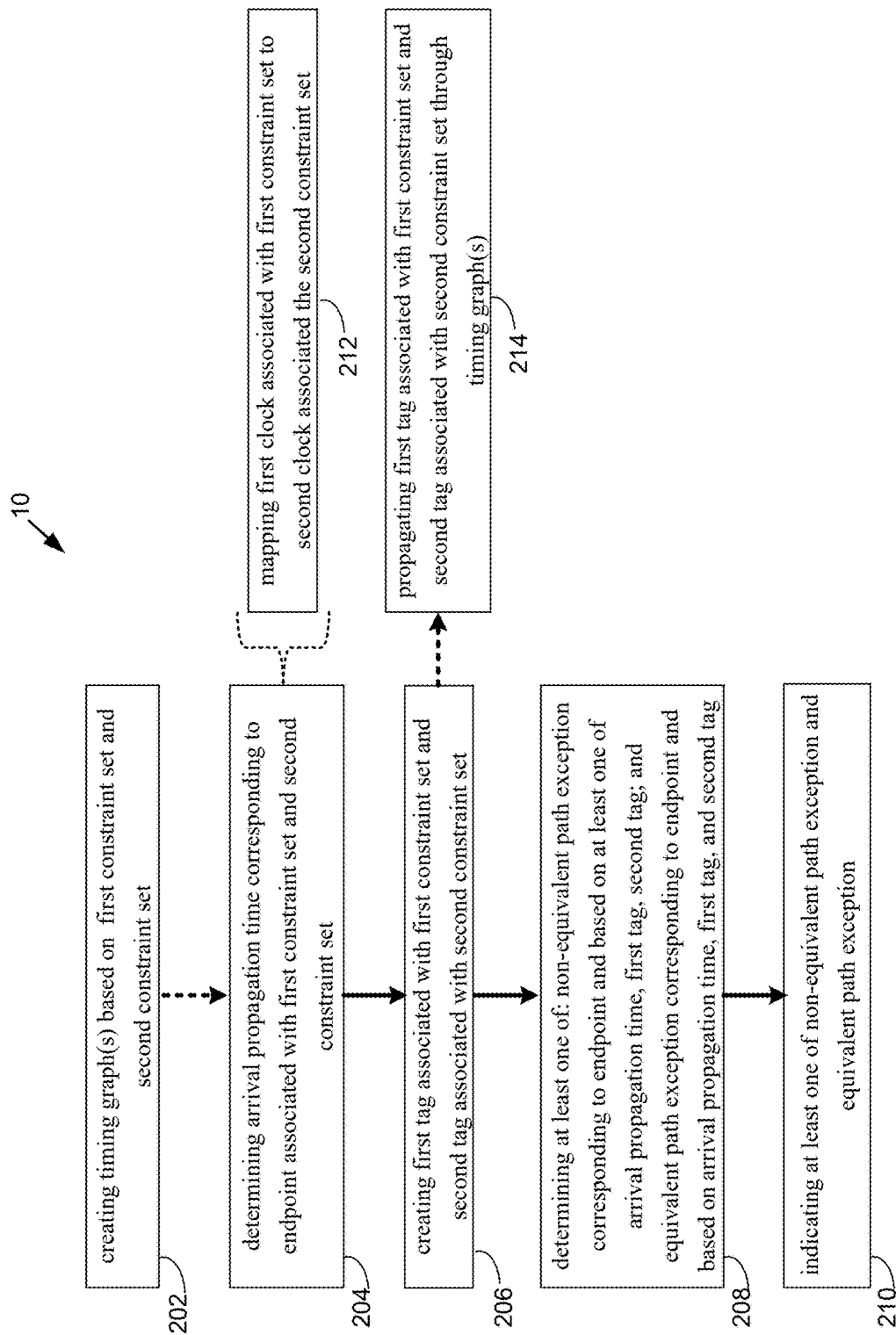
FIG. 2 is an example flowchart of the CSC process according to an embodiment of the present disclosure.

Referring now to FIG. 2, a flowchart depicting an embodiment consistent with CSC process 10 is provided. The process or method included herein may include determining 204, using at least one processor, at least one arrival propagation time corresponding to at least one endpoint. The at least one endpoint may be associated with a first constraint set and a second constraint set. The method may further include creating 206, creating, using the at least one processor, a first tag associated with the first constraint set and a second tag associated with the second constraint set. The method may also include determining 208, using the at least one processor, at least one of: a non-equivalent path exception corresponding to the at least one endpoint and based at least in part on at least one of the arrival propagation time, the first tag, and the second tag; and an equivalent path exception corresponding to the at least one endpoint and based at least in part on the arrival propagation time, the first tag, and the second tag. The method may additionally include indicating (210) using the at least one processor, at least one of the non-equivalent path exception and the equivalent path exception. Numerous additional operations are also within the scope of the present disclosure.

Identifying partially overlapping constraints and fully overlapping constraints may be challenging. To check for equivalent path exceptions (or other constraints) between two sets of constraints, each set of constraints may be loaded into a separate view, and endpoints impacted by a path exception in either view may be checked. A path exception may be a timing constraint which may be specified for a subset of connected paths in a circuit. For example, some combination of "from" pins and/or clocks, "to" pins and/or clocks, and "through" pins may be specified to indicate a path exception. Multiple sets of through pins can may be specified. For example a path exception specification may be "through pin1, pin2, or pin3 AND through pin4 or pin5".

The specification may also restrict the path to a particular signal transition on a pin (e.g. rising signals from a set of pins). The timing constraint itself may indicate a condition such as a false path, a multicycle path (e.g., extra clock cycles for a signal to travel through the path), or a minimum or maximum delay (e.g., a time for the signal to traverse through the path). For a path exception to be equivalent, each path to an endpoint covered by the path exception in one view needs to be covered by a matching path exception in the other view. This type of check should be performed for each endpoint which is reached from a path exception in either view.

For example, a first constraint set may include the constraint set false path through buf1/Y and a second constraint set may include the constraint set false_path through buf1/A. The constraints may be functionally equivalent but may not be checked directly because they are set on different pins (e.g., pin Y and pin A). All timing endpoints in a fanout cone of buf1 may be checked and may be verified to be impacted by false path constraints in both views. For path constraints of other types, non-path parameters of the constraints may be checked for equivalence at the endpoints as well (e.g., cycle counts, delay adjustments).

Figure 3:
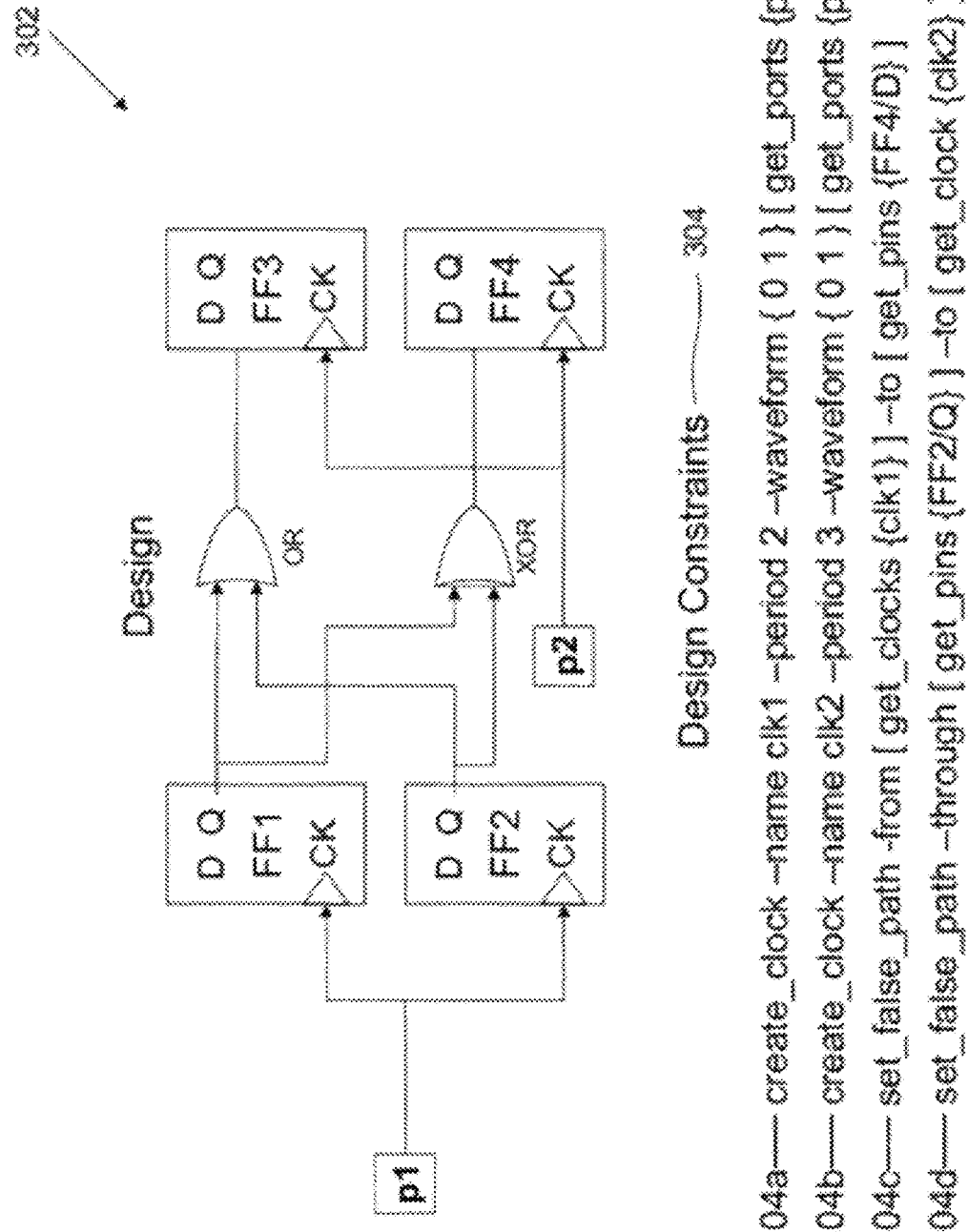
FIG. 3 shows an example constrained circuit design in accordance with the present disclosure.

Referring now to FIG. 3, an example constrained circuit design in accordance with the present disclosure is shown. FIG. 3 shows a flattened design 302 that includes two pins p1 and p2 (e.g., for receiving clock inputs), four flip-flops FF1, FF2, FF3, and FF4, an OR gate and a XOR gate. Four design constraints 304 are shown including two for clock creation and two for designating false paths. The first design constraint 304a may create a clock clk1 at port p1 with a specified period and waveform, and the second design constraint 304b may create a clock clk2 at port p2 with a specified period and waveform. A first false path 304c may be set from clock clk1 to the flip-flop port FF4/D, and a second false path 304d may be set through flip-flop port FF2/Q to clock clk2.

Figure 4:
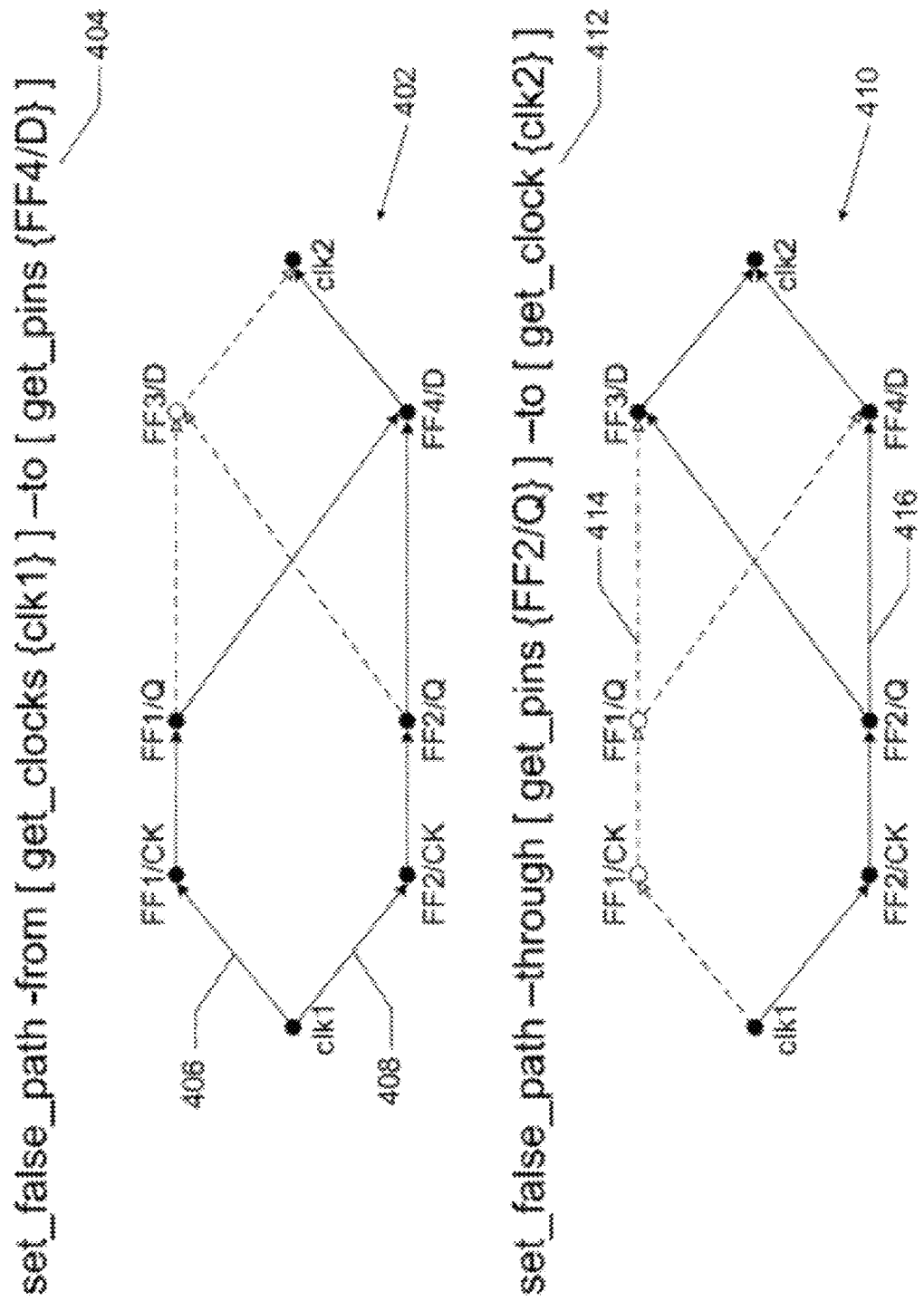
FIG. 4 shows example timing graphs associated with the constrained circuit design of FIG. 3.

Referring to FIG. 4, example timing graphs are shown. A static timing analysis may be based on computing worst-case delays for each arc in a timing graph. The delays may be accumulated as arrival times from timing graph startpoints to timing graph endpoints. For efficiency, the worst-case for the arrival times may also be computed as the they propagate forward. For example, in FIG. 3, arrival times associated with pin p1 based on the clock clk1 definition may be computed, including one arrival time for a rising edge of the clock and another arrival time for the falling edge of the clock. Further, a fastest and slowest delay time may be computed for a signal to travel from the pin P1 to the flip-flop FF1/CK and to the flip-flop FF2/CK. These delay times may be added to the arrival times at the pin P1 to compute arrival times at the flip-flop FF1/CK and the flip-flop FF2/CK. Additionally worst-case delay times may be computed between the flip-flop FF1/CK and the flip-flop FF1/Q, between the flip-flop FF2/CK and the flip-flop FF2/Q, and so forth.

When a pin such as an OR gate output (e.g., as in FIG. 3) is reached, there may be two sets of arrivals times computed. A first set of arrival times may be computed from a first input pin of the OR gate and a second set of arrival times may be computed from a second input pin of the OR gate. A minimum and maximum of the computed arrival times may be stored on the OR gate output and propagated forward. There may be multiple sets of arrival times based on different conditions on fanin paths reaching a pin. Each set of arrivals times may be represented by a phase. The phase may include an arrival time for the fastest and slowest possible time for the rising and falling signal edge, for a total of 4 time values.

The worst-case of arrival times may be computed when conditions of the paths which produced those arrival times are equivalent. The conditions may be represented by extra data on the phases in the form of tags. For example, and referring to FIG. 3, if the flip flop FF2/CK was connected to the pin p2 instead of the pin p1, then the worst case arrival times for reaching the OR gate output from these 2 input pins may be not be computed and both sets of arrival times may be kept on the pin p2 as two phases and may be propagated forward. This is because in such a situation, corresponding launching clock information may be needed at the downstream endpoint in order to compute the correct required time. Similarly, if there is a false path exception related to one of the paths, the worst-case times may not be computed for a phase which does not refer to the same false path exception.

FIG. 4 shows example timing graphs associated with the constrained circuit design of FIG. 3. Further, FIG. 4 shows a comparison between the two false-path designations 304c and 304d for the design 302. A first timing graph 402 illustrates the first false path designation 404. The timing graph 402 includes nodes labeled for hardware elements of the design with directional edges that reflect the timing sequence (e.g., from clock clk1 as a launching clock to clock clk2 as a capturing clock). Paths corresponding to the false path designation are shown including a first path 406 given by <clk1, FF1/CK, FF1/Q, FF4/D, clk2> and a second path 408 given by <clk1, FF2/CK, FF2/Q, FF4/D, clk2>. A second timing graph 410 illustrates the second false path designation 412 including a first path 414 given by <clk1, FF2/CK, FF2/Q, FF3/D, clk2> and a second path 416 given by <clk1, FF2/CK, FF2/Q, FF4/D, clk2>. FIG. 4 also illustrates a partial overlap between the two constraints 404, 412 because a path 408 of the first timing graph 402 matches (or coincides with) a path 416 of the second timing graph 410 while some paths (e.g., 406 and 414) do not have matching counterparts.

The techniques and features of described by the present disclosure may be used to solve some of the challenges of comparing constraint sets as discussed above. An algorithm/architecture to map two different constraint sets on the same timing graph may be provided and used to perform a canonical comparison between the two constraint sets. Further, a phase propagation mechanism may be used to find path equivalence.

Figure 5:
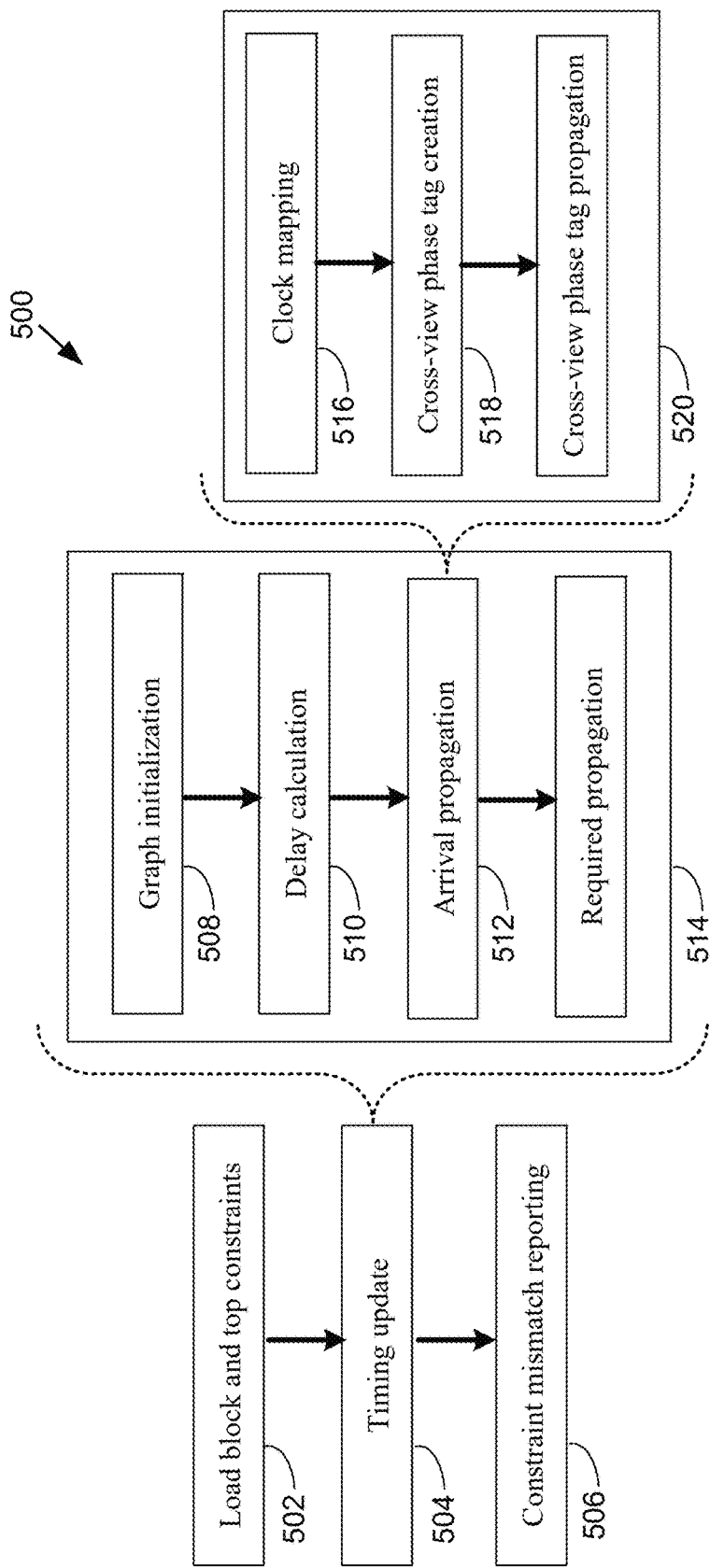
FIG. 5 is a flowchart showing example operations according to an embodiment of the present disclosure.

For example, in embodiments of the present disclosure, CSC process 10 as discussed above and shown in FIG. 2 may be implemented to improve comparison of constraint sets. Referring to FIG. 5, a flowchart showing example operations of an algorithm/architecture 500 according to embodiments of the present disclosure is shown. As discussed below, CSC process 10 may also include one or more operations of the algorithm/architecture 500 shown in FIG. 5.

For example, to compare constraint sets (e.g., block constraints and top constraints for a hierarchical instance of a design or two sets of constraints for the same design), the algorithm/architecture 500 may include the operation of loading 502 the constraint sets (e.g., the block constraints and the top constraints) of the design. The algorithm/architecture 500 may also include the operation of updating 504 timing data for the constraint sets. Updating the timing data may include delay calculation, arrival time propagation, and required time propagation. For checking the constraints, the arrival time propagation operation may include mapping between equivalent clocks in different views (which may be embedded). Further, when phases are created at path startpoints (e.g., flip-flop Q pins), extra tags may be added to the phases based on the clock mapping.

The algorithm/architecture 500 may also include the operation of reporting 506 constraint mismatches (e.g., between the block constraints and the top constraints of the design). At timing endpoints (e.g., flip-flop D pins), checking may be performed for tags on the phases in each view. Where one view's phase has a path exception tag and either there is no other corresponding view phase, or the corresponding view's phase does not have an equivalent path exception tag, the endpoint may be reported as one which is covered by the path exception in one view but not in the other view (e.g., non-equivalent path exception). One or more timing endpoints with a discrepancy for a given path exception may be reported. Further, one or more complete paths which represent a discrepancy may be reported. There may be multiple paths to the same endpoint, some of which may match between the two sets of constraints and some of which may not. Also, summary statistics for each path exception with a discrepancy (e.g., five paths covered by an exception of a first constraint set are not covered in a second constraint set) may be reported. Additionally, summary statistics for matching path exceptions may be reported (e.g., by exception or by related endpoints).

In embodiments of the present disclosure, updating 504 the timing data for the constraint sets may include initializing 508 one or more graphs representative (at least in part) of the constraints sets being compared. For example, referring back to FIG. 2, CSC process 10 may include creating 202 at least one timing graph (e.g., timing graphs 402 and/or 410 as shown in FIG. 4) based at least in part on at least one of a first constraint set and a second constraint set (e.g., the block constraints and top constraints or two sets of constraints for the same design).

Further, the algorithm/architecture 500 may include calculating 510 one or more delays associated with the constraint sets being compared. Delay times may be computed per stage (e.g., from input pin to output pin on an instance, or from a driver pin to a receiver pin on a net). The algorithm/architecture 500 may further include determining 512 arrival propagation associated with the constraint sets being compared. For example, referring back to FIG. 2, CSC process 10 may include determining 204 at least one arrival propagation time corresponding to the at least one endpoint. The at least one endpoint may be associated with a first constraint set and a second constraint set associated. Computing arrival propagation time may include accumulating the delay times into the arrival time at each pin. Determining arrival propagation may further include computing worst-case times when there are multiple arrivals times reaching a pin (e.g. at the output of a multi-input instance). The algorithm/architecture 500 may also include determining 514 required propagation associated with the constraint sets being compared. Required propagation time may be computed at an endpoint and then be propagated back through a fanin of the endpoint. Corresponding delay times may be subtracted from the required propagation. It should be noted that required propagation is being discussed herein for illustrative purposes as constraint-related processing for the constraint comparison may be performed during the arrival propagation.

In embodiments of the present disclosure, determining 512 arrival propagation associated with the constraint sets being compared may include mapping 516 clocks between the constraint sets being compared. For example, referring back to FIG. 2, CSC process 10 may include mapping 212 a first clock associated with the first constraint set to a second clock associated with the second constraint set. Clock mapping between constraint sets may include determining equivalent clock definitions based on a clock waveform definition and root pins of the clock. For example, each constraint set may define a clock with the same waveform (e.g., period, rising edge time, and falling edge times) on the same pin. These clocks may then be mapped to each other. In some cases, the clocks may not be defined on the same pin, but one of the clocks may be defined on a pin which is in the fanout of the other clock's definition pin, and the clocks may still be mapped. Further, in some cases, the clock mapping may be one clock mapped to N clocks or N clocks mapped to one clock.

Further, determining 512 arrival propagation associated with the constraint sets being compared may also include creating 518 cross-view phase tags. For example, referring back to FIG. 2, CSC process 10 may include creating 206 a first tag associated with the first constraint set and a second tag associated with the second constraint set. Determining 512 arrival propagation associated with the constraint sets being compared may also include propagating 520 the cross-view phase tags. Cross-view phase mapping may be setup at a timing startpoint (e.g., a flop-flop Q pin), and may be propagated forward as part of the phase and/or arrival propagation operations. For example, CSC process 10 may include propagating 214 the first tag associated with the first constraint set and the second tag associated with the second constraint set through the at least one timing graph. As path exception tags may be added onto a phase (e.g., for a false path 'through' pin), the cross-view phase mapping may be updated with corresponding information. For example, if the first constraint set has a false path at pin X, when the phase of the first view has a tag associated with that false path constraint, the cross-view phase tag for the second view representing the phase of the first view may include that false path tag as well.

In this way, one or more operations of algorithm/architecture 500 may be implemented (e.g., as part of CSC process 10) to map the two different constraint sets on the same timing graph and perform a canonical comparison between the two constraint sets. The canonical comparison of two constraint sets may include determining if they are functionally the same (as opposed to having identical commands). In other words, the two constraint sets may have the same impact on the timing analysis of the netlist. The first tag may correspond to a first phase of a first view associated with the first constraint set. Further, the second tag may correspond to a second phase of a second view associated with the second constraint set. In other words, the first view may include the second tag and the second view may include the first tag.

In embodiments of the present disclosure, CSC process 10 may include determining 208 at least one of: a non-equivalent path exception corresponding to the at least one endpoint and based at least in part on at least one of the arrival propagation time, the first tag, and the second tag; and an equivalent path exception corresponding to the at least one endpoint and based at least in part on the arrival propagation time, the first tag, and the second tag. The CSC process 10 may further include indicating 210 at least one of the non-equivalent path exception and the equivalent path exception (e.g., by reporting, displaying on a graphical user interface, providing to a user, or providing to a process, function, or computer program for further operations). Thus, the techniques and features of the present disclosure (e.g., including the operations of algorithm/architecture 500 and/or CSC process 10) may allow a phase propagation mechanism to be extended and used to find path exception equivalence. Tags or extra tags may be associated with the first phase of the first view (which may be associated with the first constraint set) and the second phase of the second view (which may be associated with the second constraint set). Further, clocks between the first view and the second view may be mapped for an initial phase correspondence and the tags may be synchronized as path exception tags are updated.

Figure 6:
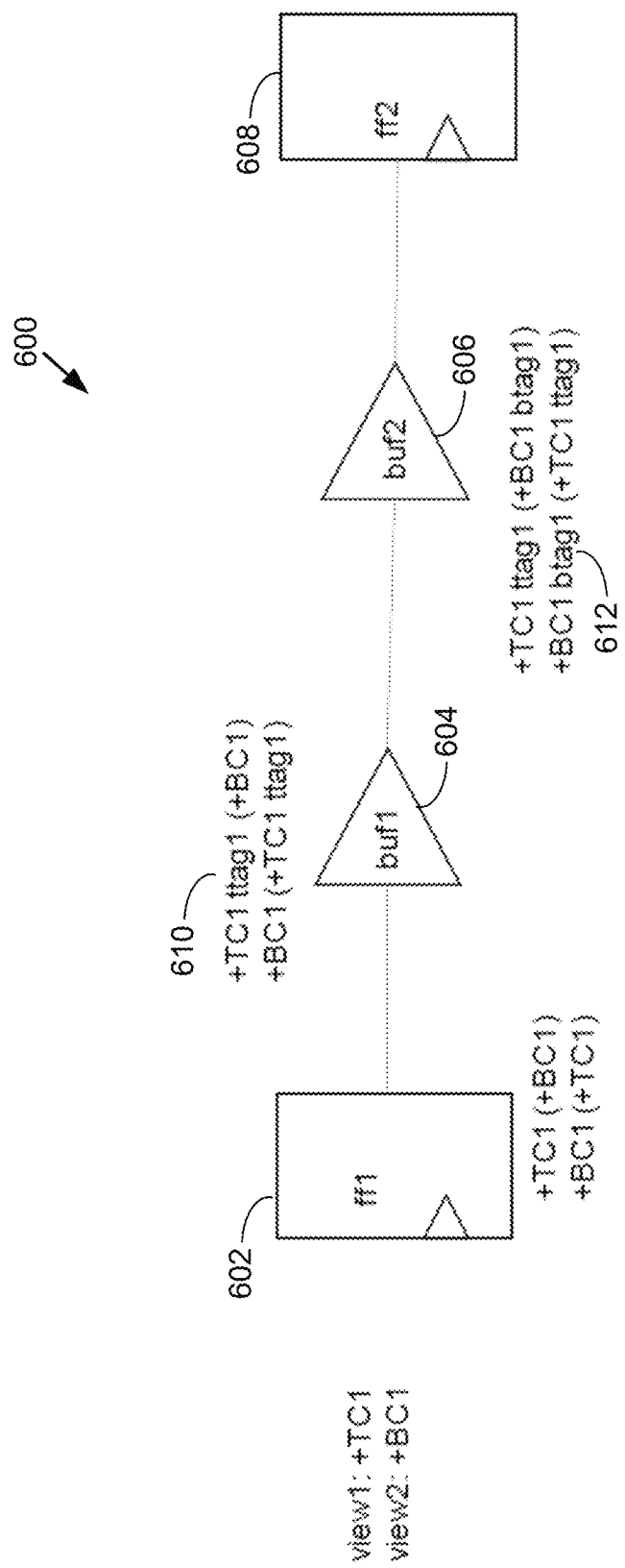
FIG. 6 shows an example netlist according to an embodiment of the present disclosure.

Referring to FIG. 6, an example netlist according to an embodiment of the present disclosure is shown. The netlist 600 is annotated with the mapped clocks and tags which may be propagated with the arrival times. Further, the netlist 600 may correspond to a circuit design and may include flip-flop 602 (i.e., ff1), buffer gate 604 (i.e., buf1), buffer gate 606 (i.e., buf2), and flip flop 608 (i.e., ff2). A first view (i.e., view1, not shown) corresponding to a first constraint set associated with netlist 600 may have a false path through buf1/A and a second view (i.e., view2, not shown) corresponding to a second constraint set associated with the netlist 600 may have a false path through buf2/A. Further, view1 may have a clock TC1 which may correspond to a clock BC1 of view2. A positive edge of the clock (TC1/BC1) may propagate from ff1 in both view1 and view2. View1 may introduce a false path tag 610 (i.e., ttag1) at buf1/A. View2 may introduce a false path tag 612 (i.e., btag1) at buf2/A. Ff2 may be an endpoint at which for view1, the tags ttag1 and btag1 may be found to correspond to equivalent path exceptions. In other words, all of the paths to ff2/D in both view 1 and view 2 may match. If view2 did not have the false path (i.e., as indicated by btag1), then btag1 would not be found for view2, and a mismatch would be detected (e.g., a non-equivalent path exception). In this way, the operations of algorithm/architecture 500 and/or CSC process 10 may be used to determine an equivalent path exception corresponding to the endpoint ff2 and based on a first tag (e.g., ttag1) associated with the first constraint set (e.g., corresponding to view1) and second tag (e.g., btag1) associated with the second constraint set (e.g., corresponding to view2).

Figure 7:
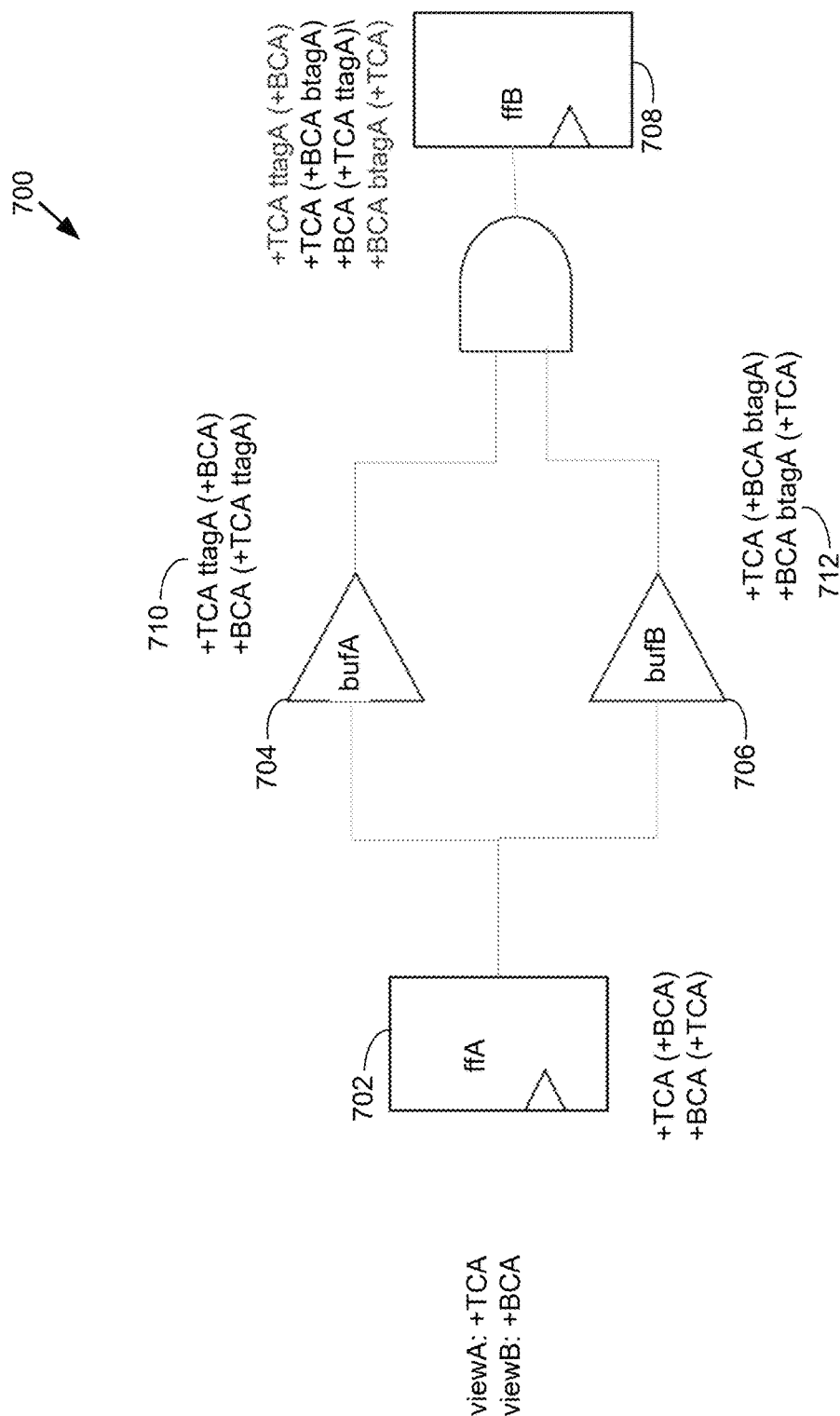
FIG. 7 also shows an example netlist according to an embodiment of the present disclosure.

Referring to FIG. 7, an example netlist according to an embodiment of the present disclosure is shown. The netlist 700 the netlist may be annotated with mapped clocks and tags which may be propagated with the arrival times. Further, the netlist 700 may include flip-flop 702 (i.e., ffA), buffer gate 704 (i.e., bufA), buffer gate 706 (i.e., bufB), and flip flop 708 (i.e., ffB). A first view (i.e., viewA, not shown) corresponding to a first constraint set associated with netlist 700 may have a false path through bufA/Y and a second view (i.e., viewB, not shown) corresponding to a second constraint set associated with the netlist 700 may have a false path through bufB/Y. Further, viewA may have a clock TCA which may correspond to a clock BCA of viewB. A positive edge of the clock (TCA/BCA) may propagate from ffA in both viewA and viewB. ViewA may introduce false path tag 710 (i.e., ttagA) at bufA/Y. ViewB may introduce a false path tag 712 (i.e., btagA) at bufB/Y. At ffB, a viewB tag that corresponds with ttagA may not be found. In other words, viewB may have a path to ffB that may not covered by a viewA false path. Similarly, viewA may have a path to ffB that may not be covered by a viewB false path. Thus, an equivalent path exception corresponding to the endpoint ffB may not be found and a non-equivalent path exception corresponding to the endpoint ffB may be found. If an equivalent cross-view exception tag is not found, there may be a path to the corresponding endpoint that is covered by the path exception in the first view, but the path does not fall under any equivalent path exception in the second view. This would mean that there is a path to an endpoint which is a false path with respect to one constraint set but it is not a false path with respect to the other constraint set.

Figure 8:
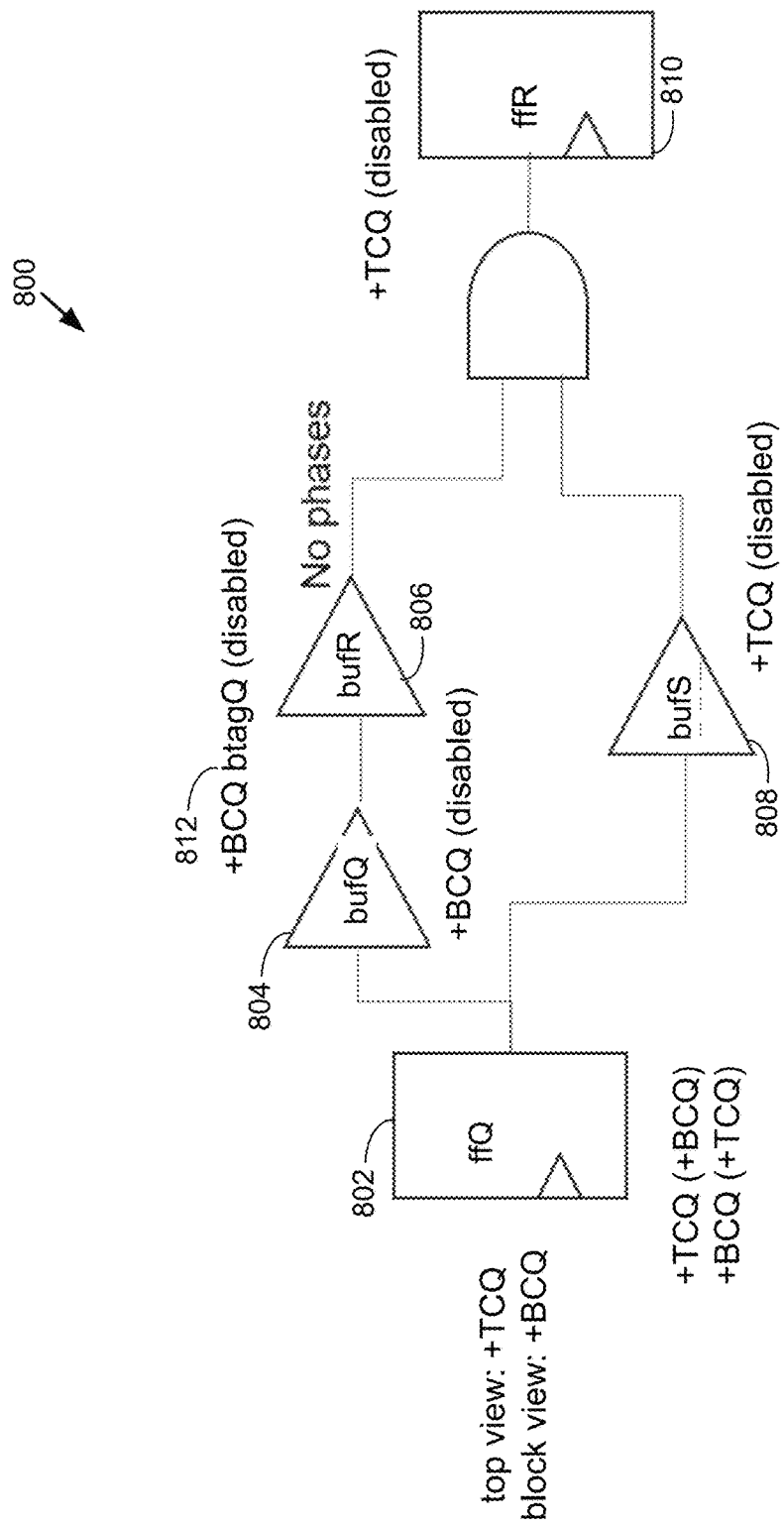
FIG. 8 also shows an example netlist according to an embodiment of the present disclosure.

Referring to FIG. 8, an example netlist according to an embodiment of the present disclosure is shown. The netlist 800 may be annotated with mapped clocks and tags which may be propagated with the arrival times. Further, the netlist 800 may include flip-flop 802 (i.e., ffQ), buffer gate 804 (i.e., bufQ), buffer gate 806 (i.e., bufR), buffer gate 808 (i.e., bufS), and flip flop 810 (i.e., ffR). Netlist 800 shows an example where a top view and a block view have an equivalent path exception with a blocked arc (or blocked timing arc). A timing arc may represent how two pins of an element or block are related. Further a timing arc may represent a direct connection between two pins (e.g., either an input and output pin on the same instance where a signal can travel from the input to the output through the gate's internal circuitry, or a driver and receiver pin on the same net, where a signal may travel from the driver to the receiver on a wire).

Timing arcs may be blocked by several different timing constraints. If a timing arc is blocked, no signal may travel from the source of the arc to the sink of the arc. Thus, with regard to a timing graph, phase and/or arrival propagation may not occur across the blocked timing arc. Blocking may be view-specific. For example, in one view, a pin may be constrained to be constant (e.g. tied high or tied low). In the case where an arc is blocked for only one view, the phases for the other view may still propagate across the arc. If there is a cross-view phase tag, then that tag may be updated to indicate that the phase on the other view was blocked, which would allow detection at the endpoint at which the path in the other view was blocked. A blocked timing arc may stop propagation for relevant views in general, but propagated phases may retain mapped information.

As shown in FIG. 8, a top view clock TCQ may be mapped to a block view clock BCQ. The top view may have the constraint set_disable_timing bufQ -from A -to Y. The block view may have the constraints set_disable_timing bufR -from A -to Y and set_disable_timing bufS -from A -to Y. A disable constraint may be a timing constraint that allows a user to directly block propagation on a particular arc. This is one of the possible ways of blocking an arc. A positive edge of the clock (TCQ/BCQ) may propagate from ffQ in both the top view and the bottom view. The bottom view may introduce false path tag 812 (i.e., btagQ) at bufR. Thus, a mismatch may be detected for the missing disable constraint in the top view. If it is determined at an endpoint that a cross-phase tag is blocked, it can be reported that the corresponding path was disabled in one constraint set but not in another. If there is another exception tag in the non-blocked view, it can be reported that the endpoint was covered by a path exception in one view but disabled in the other view.

Figure 9:
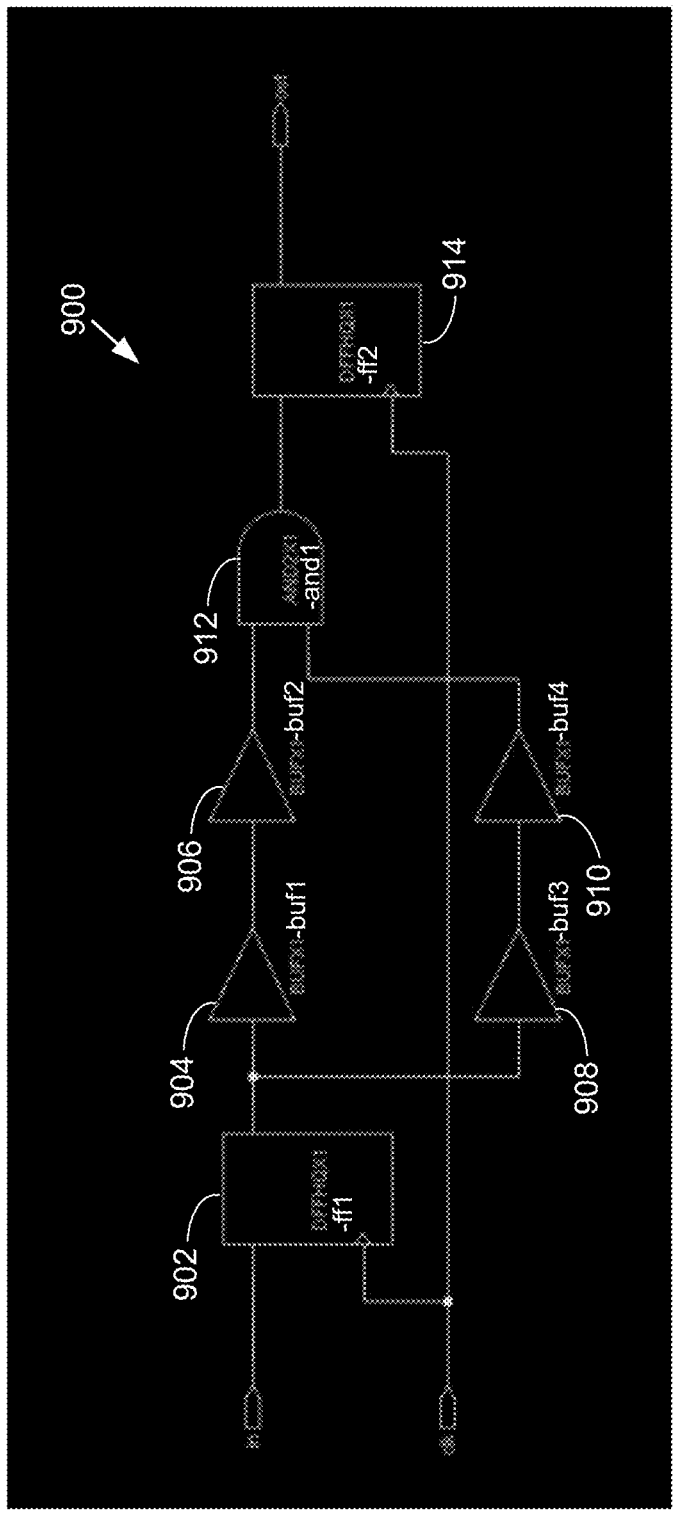
FIG. 9 also shows an example netlist according to an embodiment of the present disclosure.

Referring to FIG. 9, an example netlist according to an embodiment of the present disclosure is shown. Netlist 900 may include flip-flop 902 (i.e., DFFHQX1-ff1), buffer gate 904 (i.e., BUFX1-buf1), buffer gate 906 (i.e., BUFX1-buf2), buffer gate 908 (i.e., BUFX1-buf3), buffer gate 910 (i.e., BUFX1-buf4), AND gate 912 (i.e., AND2X1-and1), and flip-flop 914 (i.e., DFFHQX1-ff2). In an example, corresponding constraints may be set such that there is a multi-cycle path constraint through the BUFX1-buf2/A pin. A multicycle path may be a path where one or more extra clock cycles are allowed for a signal to travel to an endpoint. The number of cycles allowed may be specified as part of the multicycle path constraint. Netlist 900 and/or related sets of constraints may be processed using algorithm/architecture 500 and/or CSC process 10 as described above and one or more timing path reports may be generated. The timing path report may include the required time propagation and may show how timing of each path relates to a timing goals (e.g., whether required times were met and by how much). For constraint checking, the time values in the timing path reports may not be relevant, but the timing paths themselves may be used to determine constraint differences. A first timing path report (TPR1), provided below, shows timing data where a first path (i.e., Path 1) was not processed through BUFX1-buf2/A:

```
TPR1:
Path 1: MET Setup Check with Pin ff2/CK
Endpoint: ff2/D (^) checked with leading edge of 'clk'
Beginpoint: ff1/Q (^) triggered by leading edge of "clk"
Path Groups: {clk}
Other End Arrival Time              0.000
- Setup                             0.162
+ Phase Shift                      10.000
= Required Time                     9.838
- Arrival Time                      0.719
= Slack Time                        9.119
        Clock Rise Edge             0.000
        + Clock Network Latency (Prop)  0.000
        = Beginpoint Arrival Time   0.000
```

| Instance | Arc        | Cell    | Delay | Arrival Time | Required Time |
|----------|------------|---------|-------|--------------|---------------|
| ff1      | CK ^       | —       | —     | 0.000        | 9.119         |
| ff1      | CK ^ -> Q ^| DFFHQX1 | 0.319 | 0.319        | 9.439         |
| buf3     | A ^ -> Y ^ | BUFX1   | 0.120 | 0.440        | 9.559         |
| buf4     | A ^ -> Y ^ | BUFX1   | 0.111 | 0.551        | 9.670         |
| and1     | B ^ -> Y ^ | AND2X1  | 0.168 | 0.719        | 9.838         |
| ff2      | D ^        | DFFHQX1 | 0.000 | 0.719        | 9.838         |

Further, a second timing path report (TPR2), provided below, shows timing data where a second path (i.e., Path 2) was processed through BUFX1-buf2/A and shows an extra cycle:

```
TPR2:
Path 2: MET Setup Check with Pin ff2/CK
Endpoint: ff2/D (^) checked with leading edge of 'clk'
Beginpoint: ff1/Q (^) triggered by leading edge of "clk"
Path Groups: {clk}
Other End Arrival Time         0.000
- Setup                        0.162
+ Phase Shift                 10.000
+Cycle Adjustment             10.000
= Required Time               19.838
- Arrival Time                 0.710
= Slack Time                  19.128
        Clock Rise Edge               0.000
        + Clock Network Latency (Prop) 0.000
        = Beginpoint Arrival Time     0.000
```

| Instance | Arc | Cell | Delay | Arrival Time | Required Time |
|---|---|---|---|---|---|
| ff1 | CK ^ | — | — | 0.000 | 19.129 |
| ff1 | CK ^ -> Q ^ | DFFHQX1 | 0.319 | 0.319 | 19.448 |
| buf1 | A ^ -> Y ^ | BUFX1 | 0.120 | 0.440 | 19.568 |
| buf2 | A ^ -> Y ^ | BUFX1 | 0.111 | 0.550 | 19.679 |
| and1 | A ^ -> Y ^ | AND2X1 | 0.160 | 0.710 | 19.838 |
| ff2 | D ^ | DFFHQX1 | 0.000 | 0.710 | 19.838 |

The timing reports TPR1 and TPR2 above show the possible paths to an endpoint and show how the multicycle path exception is related to the second path (corresponding to TPR2) but not the first path (corresponding to TPR1). As shown in the "Cycle Adjustment" field in the header of TPR2, there is addition an extra 10.0 added to the required time, which was the clock period, showing this particular path had an extra clock cycle for the signal to travel to the endpoint (i.e., multicycle path).

Additionally, a phase report (PR) on the AND2X1-and1/Y pin, provided below, shows the phases, where there are separate phases with and without annotated constraint information and one phase does not have any path exception tags and the other phase has path exception tags for a multicycle path:

PR:

| Pin Transition | Propagated Slew | Arrival | Phase |
|---|---|---|---|
| and1/Y ^ | 0.085 | 0.719 | clk ^ |
| and1/Y v | 0.072 | 0.770 | clk ^ |
| and1/Y ^ | 0.085 | 0.710 | clk ^ multicycle = 2 |
| and1/Y v | 0.072 | 0.750 | clk ^ multicycle = 2 |

The phase report above may be used by developers and shows that on the and1/Y pin, there are 2 phases. The symbol "^" indicates a rising edge and the symbol "v" indicates a falling edge.

In a hierarchical constrained circuit design solution, constraint debuggability (e.g., comparing constraints) may create issues. Solutions currently available may limit efficiency and capability, and may increase difficulty of debuggability for users. Using the techniques and features described by the present disclosure, a regular timing update may build information required (e.g., by creating and propagating tags as described above) for checking constraints. By checking arrival phases on timing endpoints (e.g., comparing the exception tags on arrival phases in one view against the exception tags in the cross-view phase, as described above), constraint mismatches may be detected and/or highlighted.

The solutions provided by the techniques and features of the present disclosure may allow for avoidance of exponential path tracing to identify path related constraint mismatches, may provide a 5-10× performance improvement as compared to currently available solutions, may significantly improve constraint debuggability by allowing execution in a timing signoff environment, and may enable running constraint checking and timing analysis in the same tool/session, without a significant performance/memory cost.

In particular, implementing the techniques and features described by the present disclosure may allow avoidance of exponential path tracing by facilitating the building of constraint equivalence linearly during timing graph propagation, thus allowing constraint comparison to be performed at timing endpoints in linear time. In other words, comparing constraint sets of a circuit design may performed at a timing endpoint during propagation of the timing graph and may be based on the first view tags and second view tags. Because checking for exceptions may be performed directly based on phase information which was propagated through the timing graph, path tracing may not be necessary. Thus, the phase/arrival propagation operations performed in the timing graph may not be performed on a path by path basis, but rather may be performed with a single traversal of the timing graph in a levelized manner as described above.

It will be apparent to those skilled in the art that various modifications and variations can be made in the CSC process of embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method for comparing constraint sets of a circuit design, comprising:
   determining, using at least one processor, at least one arrival propagation time corresponding to at least one endpoint, the at least one endpoint associated with a first constraint set and a second constraint set of the circuit design;
   creating, using the at least one processor, a first tag associated with the first constraint set and a second tag associated with the second constraint set;

determining, using the at least one processor, at least one of:
  a non-equivalent path exception corresponding to the at least one endpoint and based at least in part on at least one of the arrival propagation time, the first tag, and the second tag; and
  an equivalent path exception corresponding to the at least one endpoint and based at least in part on the arrival propagation time, the first tag, and the second tag, wherein determining at least one of a non-equivalent path and an equivalent path includes comparing all constraints of the first constraint set with all constraints of the second constraint set; and
indicating, using the at least one processor, at least one of the non-equivalent path exception and the equivalent path exception.

2. The computer-implemented method of claim 1, further comprising:
creating at least one timing graph based at least in part on at least one of the first constraint set and the second constraint set.

3. The computer-implemented method of claim 1, further comprising:
mapping, based upon at least in part one or more clock characteristics and one or more definition points in the circuit design, a first clock associated with the first constraint set to a second clock associated with the second constraint set, wherein mapping includes determining an equivalence between the first clock and the second clock.

4. The computer-implemented method of claim 2, further comprising:
propagating the first tag associated with the first constraint set and the second tag associated with the second constraint set through the at least one timing graph.

5. The computer-implemented method of claim 2, wherein at least one of the first tag and the second tag are embedded in timing data propagated through the at least one timing graph.

6. The computer-implemented method of claim 2, wherein the comparing of the constraint sets of the circuit design is performed at the at least one timing endpoint during propagation of the at least one timing graph and is based on, at least in part, the first tag and the second tag.

7. The computer-implemented method of claim 1, wherein the first tag corresponds to a first phase of a first view associated with the first constraint set, the second tag corresponds to a second phase of a second view associated with the second constraint set, the first view includes the second tag, and the second view includes the first tag.

8. A non-transitory computer-readable storage medium having stored thereon instructions that when executed by a machine result in the following operations:
determining, using at least one processor, at least one arrival propagation time corresponding to at least one endpoint, the at least one endpoint associated with a first constraint set and a second constraint set of a circuit design;
creating, using the at least one processor, a first tag associated with the first constraint set and a second tag associated with the second constraint set;
determining, using the at least one processor, at least one of:
  a non-equivalent path exception corresponding to the at least one endpoint and based at least in part on at least one of the arrival propagation time, the first tag, and the second tag; and
  an equivalent path exception corresponding to the at least one endpoint and based at least in part on the arrival propagation time, the first tag, and the second tag; and
indicating, using the at least one processor, at least one of the non-equivalent path exception and the equivalent path exception, wherein determining at least one of a non-equivalent path and an equivalent path includes comparing all constraints of the first constraint set with all constraints of the second constraint set.

9. The non-transitory computer-readable storage medium of claim 8, further comprising:
creating at least one timing graph based at least in part on at least one of the first constraint set and the second constraint set.

10. The non-transitory computer-readable storage medium of claim 8, further comprising:
mapping, based upon at least in part one or more clock characteristics and one or more definition points in the circuit design, a first clock associated with the first constraint set to a second clock associated with the second constraint set, wherein mapping includes determining an equivalence between the first clock and the second clock.

11. The non-transitory computer-readable storage medium of claim 9, further comprising:
propagating the first tag associated with the first constraint set and the second tag associated with the second constraint set through the at least one timing graph.

12. The non-transitory computer-readable storage medium of claim 9, wherein at least one of the first tag and the second tag are embedded in timing data propagated through the at least one timing graph.

13. The non-transitory computer-readable storage medium of claim 9, wherein the comparing of the constraint sets of the circuit design is performed at the at least one timing endpoint during propagation of the at least one timing graph and is based on, at least in part, the first tag and the second tag.

14. The non-transitory computer-readable storage medium of claim 9, wherein the first tag corresponds to a first phase of a first view associated with the first constraint set, the second tag corresponds to a second phase of a second view associated with the second constraint set, the first view includes the second tag, and the second view includes the first tag.

15. A system comprising a computing device having at least one processor and a memory, wherein the at least one processor is configured to:
determine at least one arrival propagation time corresponding to at least one endpoint, the at least one endpoint associated with a first constraint set and a second constraint set of a circuit design;
create a first tag associated with the first constraint set and a second tag associated with the second constraint set;
determine at least one of:
  a non-equivalent path exception corresponding to the at least one endpoint and based at least in part on at least one of the arrival propagation time, the first tag, and the second tag; and
  an equivalent path exception corresponding to the at least one endpoint and based at least in part on the arrival propagation time, the first tag, and the second tag; and
indicate at least one of the non-equivalent path exception and the equivalent path exception, wherein determining at least one of a non-equivalent path and an equivalent path includes comparing all constraints of the first constraint set with all constraints of the second constraint set.

16. The system of claim 15, wherein the at least one processor is further configured to:
   create at least one timing graph based at least in part on at least one of the first constraint set and the second constraint set.

17. The system of claim 15, wherein the at least one processor is further configured to:
   map, based upon at least in part one or more clock characteristics and one or more definition points in the circuit design, a first clock associated with the first constraint set to a second clock associated with the second constraint set, wherein mapping includes determining an equivalence between the first clock and the second clock.

18. The system of claim 16, wherein the at least one processor is further configured to:
   propagate the first tag associated with the first constraint set and the second tag associated with the second constraint set through the at least one timing graph.

19. The system of claim 16, wherein at least one of the first tag and the second tag are embedded in timing data propagated through the at least one timing graph.

20. The system of claim 15, wherein the first tag corresponds to a first phase of a first view associated with the first constraint set, the second tag corresponds to a second phase of a second view associated with the second constraint set, the first view includes the second tag, and the second view includes the first tag.

\* \* \* \* \*